Aug. 12, 1930.  M. DUNBAR  1,773,032
TORSION BALANCE
Filed Aug. 25, 1925  2 Sheets-Sheet 2
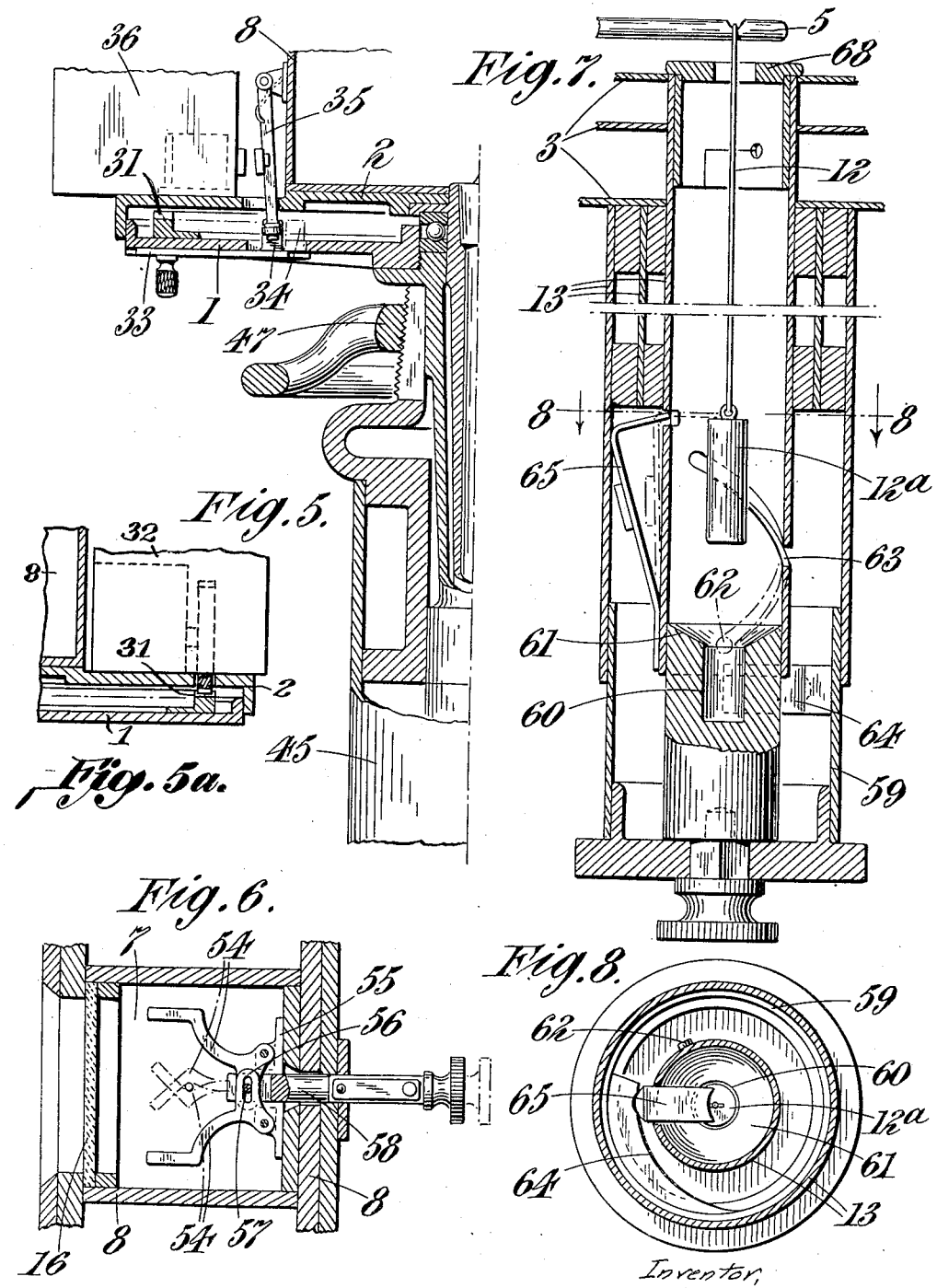

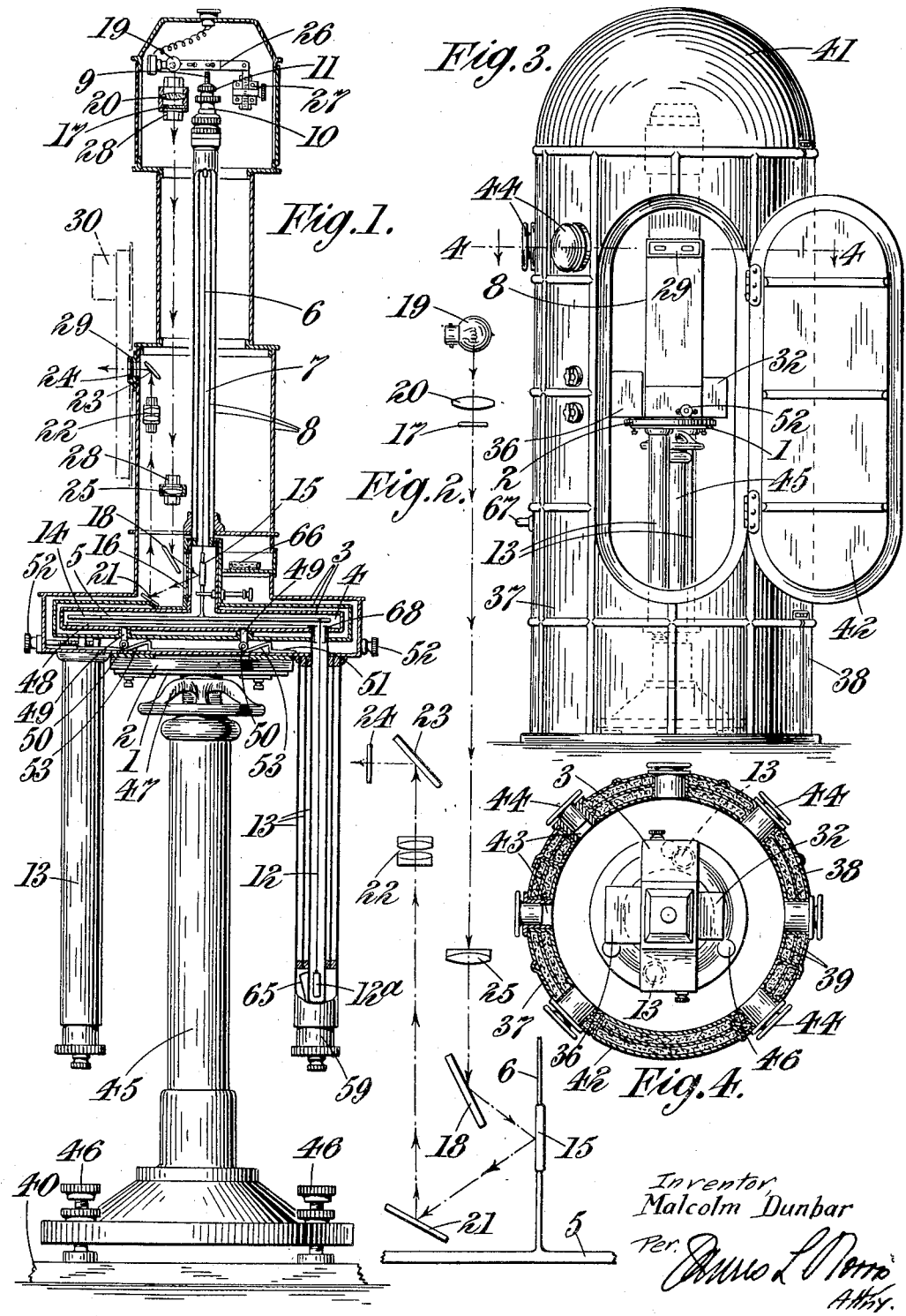

Patented Aug. 12, 1930

1,773,032

UNITED STATES PATENT OFFICE

MALCOLM DUNBAR, OF LONDON, ENGLAND, ASSIGNOR TO L. OERTLING LIMITED, OF LONDON, ENGLAND

TORSION BALANCE

Application filed August 25, 1925, Serial No. 52,436, and in Great Britain January 2, 1925.

This invention relates to improvements in torsion balances of the kind in which a bar is suspended by a wire within a casing and carries a suspended weight at one end counterbalanced by a weight supported directly on the other end of the bar, the deviation of the bar in a horizontal plane from a zero position within the casing under the effects of gravitational or mass attraction being employed, for example, for the investigation of terrestrial gravitational fields.

An optical system comprising a mirror supported on the bar is provided for indicating deviations of the bar, this system also permitting a photographic record of the indications to be obtained.

The wire on which the bar is suspended is of necessity carefully isolated from the effects of variations of temperature, and with this intention the suspension wires, the bar, and the suspended weight are enclosed in a casing comprising a horizontally arranged box or tube for the bar with a vertically arranged box or tube for the bar's suspension wire extending upwardly from the central part thereof and a second vertically arranged box or tube depending from near one end of the horizontal box or tube to enclose the suspended weight and its suspension wire. These boxes or tubes are each enclosed in one or more boxes or tubes similar as regards shape and position to the parts which they enclose and spaced apart therefrom, thus forming a multiple walled casing which is mounted to rotate about a vertical axis on a standard of convenient construction.

The said invention is chiefly directed towards the provision of a more convenient optical indicating and registering system, an important feaure of which is the arrangement in the system of a fixed graduated index or scale, the image of which is reflected by the mirror on the bar so that it can be read through a conveniently situated sight aperture furnished with a cross wire or other datum mark. This arrangement enables direct readings of the deviations of the bar to be taken in numerical values and thus determination of the readings by the measurement of charts or diagrams is avoided.

As an additional protection for the instrument when set up for use in the field, the instrument is arranged within a tent or chamber to protect it against the effects of vibration due to winds, draughts or currents of air impinging against the standard and against the rotary casings mounted thereon, this tent or chamber providing additional protection to the instrument against radiation effects and atmospheric changes. The said tent or chamber may be constructed with a door and glazed windows or shuttered openings spaced apart around the tent so that readings can be taken from outside the tent when the instrument within is in different positions of orientation. Moreover, to avoid the necessity for opening the door of this tent or chamber when a series of readings are to be taken with the instrument in different positions of orientation, the rotatably mounted casings are moved from one position to another by means of a spring actuated or other suitable motor which can be controlled at will from outside the tent, or can be controlled by a suitable timing mechanism.

Referring to the accompanying drawings:—

Figure 1 is a side view, partly in section, of the improved torsion balance removed from its outer enclosing tent or chamber.

Figure 2 is a diagram illustrating the arrangement of the optical system.

Figure 3 is a view on a smaller scale than Figure 1 showing the instrument within its enclosing tent or chamber, the door of which is in the open position.

Figure 4 is a sectional plan view of the instrument and the outer tent or chamber on the line 4—4, of Figure 3.

Figure 5 is a detail view of a device for holding the automatically rotated parts of the instrument at rest in predetermined positions for predetermined periods.

Figure 5ª is a detail view, similar to Figure 5, showing another part of the instrument.

Figure 6 is a detail sectional view of a device for holding the suspension wire of the torsion balance in position after the load supported thereon has been lifted from its suspension.

Figure 7 is a detail view in vertical section, illustrating a device for supporting the weight suspended from the bar hereinabove referred to, and Figure 8 is a horizontal section thereof on the line 8—8, Figure 7.

As shown in Figure 1, a standard provided with levelling screws supports a fixed table 1 above which is mounted a rotary table 2 serving as a base or support for a triple walled casing 3 enclosing a comparatively narrow and shallow horizontally extending space 4 in which a bar 5 is suspended by a wire 6 enclosed in a space 7 with double walls 8 extending vertically upward from the central part of the casing 3. At the upper part of the vertically extending casing formed by the walls 8 a support is provided to which the wire is attached, this support comprising a screwed plug 9 mounted in a screwed bushing 10, with a lock nut 11 whereby the point of attachment of the wire to the screwed plug can be adjusted both vertically and rotationally and secured in the position to which it is adjusted.

The construction illustrated in Figure 1 provides two similarly suspended bars and weights, as usual, arranged one behind the other in this figure and spaced apart to swing through a small angle each in its own lateral half of the casing. Each bar, at one end thereof, supports a wire 12 on which a weight 12$^a$ is suspended, the wire and weight being enclosed in a triple walled casing 13 extending vertically downward from near to one end of the casing 3, the casing 13 for one wire and weight being arranged at or near one end of the casing 3 and the corresponding casing 13 for the other wire and weight being arranged at or near the opposite end of the said casing 3. Each bar carries a counterweight 14 so that the bar assumes a horizontal position.

Each of the said bars has associated with it an optical system, the optical systems of the two bars being alike so that a description of one will serve for both. At or near the lower end of the wire on which the bar is suspended a mirror 15 is provided opposite to a glazed aperture 16 in an inner wall of the casing 8 in which this suspension wire is contained.

In the upper part of the casing an index or scale 17 is provided, shown in transverse section in Figure 1, and light reflected from or transmitted through this index or scale is projected downwardly in the casing to a mirror 18 or prism or other total reflector by which the image of the index or scale is reflected on to the mirror 15 which moves with the bar. The light reflected by the mirror may be viewed directly through a sight aperture or telescope in alignment with the mirror. Figures 1 and 2 of the drawing show a preferable arrangement in which a source of light such as an electric lamp 19 is provided in the upper part of the casing 8, the light originating from this source is transmitted through a lens 20 and through the transparent or translucent index or scale 17 on which suitable graduations are marked, and the light passing through this scale is focussed on the mirror 18 or other reflecting surface so that a part of the bar of light proceeding through the scale is reflected from the mirror 18 to the mirror 15 and again reflected to a mirror 21 or other reflecting surface by which it is returned along a path substantially parallel to the path of the rays proceeding vertically downwards through the casing from the source of light 19 to the mirror 18. The light reflected from the mirror 21 passes through a magnifying lens 22 by which only a part of the image reflected from the mirrors 15, 21, is projected on to a reflector 23 by which it is reflected on to a viewing screen 24 across which a suitable zero or datum mark is drawn. A magnifying lens 25 may also be placed in the path of the light moving across the space between the scale 17 and the reflector 18.

By thus providing one or more magnifying lenses in the optical system the deflection of the light beam can be very accurately measured. The lamp 19 may be carried on a frame 26 with a sliding horizontal adjustment and a pinion and rack vertical adjustment 27. The mirrors may be arranged in adjustable mountings and the lenses carried on frames 28 adjustable along the optical path for the purpose of varying the magnification or focussing the beam of light. The viewing screen 24 of ground glass or the like is arranged in a guideway in a frame 29 so that it can be removed by sliding it endwise therein. The guideway in which the viewing screen is mounted can be arranged to hold in place of the said screen, a box or camera 30 indicated in broken lines whereby a strip of sensitized paper or the like can be exposed opposite to the sight aperture, the box or camera being provided with a convenient form of mechanism to advance the sensitized strip from time to time as may be required. Thus a series of readings can be taken automatically on this strip without it being necessary for access to be had to the instrument after it has been set in position within the tent or chamber and without requiring the opening of any doors or apertures therein so that the least possible interference with or manipulation of the instrument is called for. The fixed table 1 has a circular rack 31 thereon (Figures 5 and 5$^a$) and a pinion rotatably mounted in bearings on the rotary table and rotated by a spring or other suitable motor arranged in a casing 32 engages with the rack so as to effect an automatic rotation of the fixed table 1. The table is further provided with sliders 33 movable radially in the table and having lugs 34 projecting therefrom into the path of a stop arm 35 which is carried on the casing 8 and projects through a radial slot in the rotatable table 2. In the position in which the sliders 33 are shown in Figure 5 it obstructs the passage of the stop arm 35 while it is in the position in which it is shown, so that the rotatable casing and table 2, which rotate together, are brought to rest. In order to allow the table to be set in movement by the motor, an electro-magnet is provided in a timing mechanism box 36 and this electro-magnet is energized at different periods as required to draw the stop arm towards the box 36 so that it can pass clear of the lug 34. The sliders 33 may be separately moved so as to be out of the path of the stop arm 35, as indicated in broken lines in Figure 5, so that the arm 35 and rotary table will not be arrested by a slider which has thus been moved. By means of this arrangement the rotary table can be mechanically moved successively to different positions around the fixed table and held at rest in any of these positions by a slider 33 provided at the selected position for a period of time determined by a suitable setting of the timing mechanism without further attention.

The enclosing tent or chamber may be constructed with flat or curved walls that is to say it may be rectangular, hexagonal, circular or any other convenient section in plan but preferably, as illustrated in Figures 3 and 4, it is made in two halves or parts 37, 38 each of a substantially semi-cylindrical shape of thin light metal, canvas, wood or waterproof fabric with or without linings or packings of heat insulating material 39 between its inner and outer walls. It is however obvious that the tent or chamber may comprise a baseboard or ring 40, two or more wall segments 37, 38 and a separate roof section 41. The tent or chamber may be constructed with one or more doors 42 allowing access to be had to the interior of the tent or chamber for the purpose for example, of adjusting the instrument mounted therein. In addition a number of sight apertures 43 which can be closed by means of removable caps 44 or other closure means are provided around the wall of the tent or chamber 37, 38 at the height of the viewing screen 29 carried on the rotatable casing of the instrument so that readings can be taken from outside the tent without opening the door 42 of the latter.

When the instrument is set up for taking a reading the standard 45 is levelled by means of the levelling screws 46 and the fixed table is brought to the required orientation and locked in this position by means of the lock nut 47. The sliders 33 are then set to stop the motion of the rotary casing or to allow the same to pass as may be required so that readings either visual or photographic can be taken at the required positions of angular displacement and the timing mechanism 36 is adjusted to give the required pause at each stopping place. By the operation of this timing mechanism the circuit of the lamp 19 is closed so that if a camera is in position at the sight aperture 24 a photographic record of the position of the suspended bar 5 or mirror 15 is obtained. The light is then extinguished and the timing mechanism acts to draw the stop bar 35 away from the obstruction of the lug 34 on the slider. At the same time the sensitized strip is moved ready for the next exposure. The driving mechanism 32 then comes into operation and rotates the rotary casing until the stop bar 35 comes into contact with the next obstructing lug. The instrument then remains at rest for a predetermined period depending on the setting of the timing mechanism whereupon the lamp circuit is again closed and the sequence of operations repeated. If desired the photographic apparatus can be removed and a ground glass or like screen 24 inserted in the guideway. Readings can then be taken through the sight apertures in the wall of the tent or chamber, the lamp circuit being closed by hand when required by a switch arranged in a convenient position exteriorly to the tent or chamber. In this case the stop arm 35 can also be conveniently moved by the closing of another switch likewise arranged exteriorly to the tent or chamber.

In order to protect the suspension wire 6 from injury whilst the instrument is being transported from place to place, a lifting table 48 is provided within the inner casing 3 containing the suspended bar 5. This table has lugs 49 depending therefrom with rollers 50 at their lower ends. These lugs are guided in guideways provided in the casing and the rollers are arranged above a slider 51 having inclined surfaces 53 thereon which, by means of a screw 52 engaging a nut at one end of the slider as shown in Fig. 1, can be moved beneath the rollers so as to raise the table 48 and lift the suspended bar 5 into contact with the top wall of the chamber 4 in which it is lodged. This bar can thus be clamped to the wall of the chamber against movement resulting from tilting of the instrument in any direction.

In order to prevent the suspension wire 6 and the mirror 15 carried thereon from striking against the walls of the chamber 7 or from injury by swinging movements of the wire therein, a tongs device is provided near the lower end of the wire as shown in Figure 6, this tongs device comprising jaws 54 pivoted on frame parts 55 and having slotted lugs 56 in which pins 57 on a sliding bar 58 engage. In the position shown in full lines the jaws 54 are in the open position but by drawing the bar 58 outwardly they can be moved to the position in which they are shown in broken lines so as to clamp between them the suspension wire 6 and hold it against movement. A door is provided in a convenient part of the casing 8 through which access can be had to the sliding bar.

At such times it is desirable to provide means for supporting the suspended weight 12a and this can be conveniently provided for by the arrangement illustrated in Figures 7 and 8. A cap 59 is arranged to slide within the outer wall of the casing 13 and carries at its centre a cup 60 slidable within the inner wall of the casing. This cup is provided with a cone shaped lip 61 for guiding the weight 12a into the lower cylindrical part of the cup in which the weight can be held against movement. The cap 59 and the cup 60 are supported in their lowermost position by a pin 62 on the exterior of the cup engaging in a spiral groove 63 in the inner wall of the casing so that when an axial movement is given to the cap and cup they also have a corresponding rotary movement in which a cam 64 within the cap is brought into contact with a spring arm 65 which is thereby moved inwardly above the weight now lodged in the cup to prevent the weight from falling out of the cup if the instrument is inclined to a sufficient angle or even turned upside down. Figure 7 shows the cap and cup in the lowermost position and Figure 8 shows these parts raised so that the cam 64 holds the arm 65 above the cup.

To ensure against the formation of aqueous films on the innermost casing containing the bar or suspension wires due to condensation from the atmosphere in which the loaded bar is suspended and in order that the instrument may be protected from interference resulting, for example, from adhesion of the weights or bars to the walls of the casings, due to surface tension, a tray 66 or other convenient receptacle is provided to hold a hygroscopic material such as calcium chloride or phosphoric anhydride, an opening being provided through the casings to enable this tray to be inserted or removed for the purpose of renewing the hygroscopic material as required.

In the construction of torsion balances of the kind to which this invention relates it has heretofore been usual to support each inner box or tube within an air filled space in the box or tube enclosing it. In some cases it is now proposed to exhaust the air from these spaces, or to fill the same with a heat insulating or non-conducting material such as slag, wool, capok, or the like, blocks of wood, ebonite or the like being arranged as desired to hold the boxes or tubes securely in position one within the other. The air can also be withdrawn from the interior spaces within the casings 3, 8 and 13 in which the wires 6 and 12, the bars 5 and the weights 12a are enclosed.

The tent or chamber 37, 38 is provided with handles 67 and means for securing together the base board 40 and walls 37, 38, so that the tent or chamber with the instrument therein can be readily transported from place to place.

As a further precaution against adhesion of the wire 12 to the sides of the casing 13, a thimble 68 may be inserted in the upper part of the innermost wall of this casing having a slot therein through which the wire 12 passes. When the instrument is level and the bar and weights have come to rest so that the wire hangs vertically within the casing, the wire passes freely through the slot, but when the weight is swinging or the wire is slack by reason of the lifting of the weight, the slot prevents the wire from coming into contact with and adhering to the casing wall.

Instruments of the kind herein described are employed for making gravitational surveys on the earth's surface by setting up the instrument at different stations and taking a series of readings at each station, each reading being taken when the instrument is set in a different position of orientation. The readings thus obtained are employed in a formula to enable a value to be determined which can be plotted on a map to give contour lines indicating the gravitational attraction of subterranean bodies.

I claim:

1. A torsion balance comprising a suspended bar, a weight suspended from one end of the bar, a weight supported directly by the opposite end of the bar, a heat insulating casing enclosing the bar and weights, a rotary table on which the casing is mounted, a fixed table carrying the rotary table, a casing carried on the rotary table to enclose a motor for rotating the rotary table relatively to the fixed table and pivotally mounted stop arms for temporarily arresting the movement of the rotary table in predetermined positions relatively to the fixed table.

2. A torsion balance comprising a suspended bar, a weight suspended from one end of the bar, a weight supported directly by the opposite end of the bar, a heat insulating casing enclosing the bar and weights, a rotary table on which the casing is mounted, a fixed table carrying the rotary table, a casing carried on the rotary table to enclose a motor for rotating the rotary table relatively to the fixed table, a stop arm carried by the rotary table, sliders on the fixed table movable into and out of the path of the stop arm and a timing mechanism for releasing the stop arm from the obstruction of any slider by which it may at the time be arrested.

3. A torsion balance comprising a suspended bar, a weight suspended from one end of the bar, a weight supported directly by the opposite end of the bar, a heat insulating casing enclosing the bar and weights, a standard, a rotatable support on said standard, a casing carried on the rotatable support to enclose a motor for imparting movement thereto, and a removable heat insulating casing for enclosing the rotatably mounted casing, motor casing and standard.

4. A torsion balance comprising a suspended bar, a weight suspended from one end of the bar, a weight supported directly by the opposite end of the bar, a heat insulating casing enclosing the bar and weights, a standard, a rotatable support for said casing on the standard, and a removable heat insulating casing having sight apertures and enclosing the said standard and casing mounted on said standard.

5. A torsion balance comprising a suspended bar, a weight, a wire suspending said weight from one end of the bar, a weight supported directly by the opposite end of the bar, a heat insulating casing enclosing the bar, wire and weights, a lifting table and rollers, a slider, and a screw device for moving the slider for clamping the said bar against movement within the said casing.

6. A torsion balance comprising a suspended bar, a weight, a wire suspending said weight from one end of the bar, a weight supported directly by the opposite end of the bar, a heat insulating casing enclosing the bar, wire and weights, and a cup for raising the weight suspended by the wire to relieve the wire from the load of the weight.

7. A torsion balance comprising a suspended bar, a weight, a wire suspending said weight from one end of the bar, a weight supported directly by the opposite end of the bar, a heat insulating casing enclosing the bar, wire and weights, a cup for lifting the load of the wire suspended weight from its supporting wire and an arm movable above the cup to retain the weight therein.

8. A torsion balance comprising a suspended bar, a weight, a wire suspending said weight from one end of the bar, a weight supported directly by the opposite end of the bar, a heat insulating casing enclosing the bar, wire and weights, and a tongs device for gripping the suspension wire to hold it against movement in the casing.

9. A torsion balance comprising a suspended bar, a weight, a wire suspending said weight from one end of the bar, a weight supported directly by the opposite end of the bar, a standard, a heat insulating casing rotatably supported on said standard and enclosing the bar, wire and weights, a removable heat insulating casing enclosing the said standard and rotatable casing, and means controllable from outside the removable casing for changing the orientation of the rotatable casing within the said removable casing.

10. A torsion balance comprising a suspended bar, a weight suspended from one end of the bar, a weight supported directly by the opposite end of the bar, a heat insulating casing enclosing the bar and weights, a standard, a rotatable support for the said casing on the standard, and a removable heat insulating casing enclosing the said standard and the casing mounted on the standard, and means for transmitting to the exterior of the removable casing a visual indication of movements of the said suspended bar.

11. A torsion balance comprising a suspended bar, a weight suspended from one end of the bar, a weight supported directly by the opposite end of the bar, a heat insulating casing enclosing the bar and weights, a standard, a rotatable support for said casing on the standard, a removable heat insulating casing enclosing the said standard and the first-named casing, a source of light within the first-named casing, a mirror movable with the bar, a viewing screen carried by said first-named casing, an optical system directing light from the source to the mirror and directing light reflected from the mirror to said viewing screen, said removable heat insulating casing having sight apertures through which the said screen can be viewed.

12. A torsion balance comprising a suspended bar, a weight suspended from one end of the bar, a weight supported directly by the opposite end of the bar, a heat insulating casing enclosing the bar and weights, a viewing screen carried by said casing, a standard, a rotatable support for the said casing on the standard, a removable heat insulating casing enclosing the said standard and the casing mounted on the standard, an illuminated transparent scale, a mirror movable with the bar, and an optical system for directing an image of the scale reflected from the mirror on to said viewing screen, said removable heat insulating casing having sight apertures through which the said screen can be viewed.

MALCOLM DUNBAR.